Aug. 18, 1953     E. B. MILLER     2,649,360
CARBON BLACK FURNACES

Filed Jan. 24, 1949     3 Sheets-Sheet 1

Inventor
ERNEST B. MILLER

By Adams + Bush

ATTORNEYS

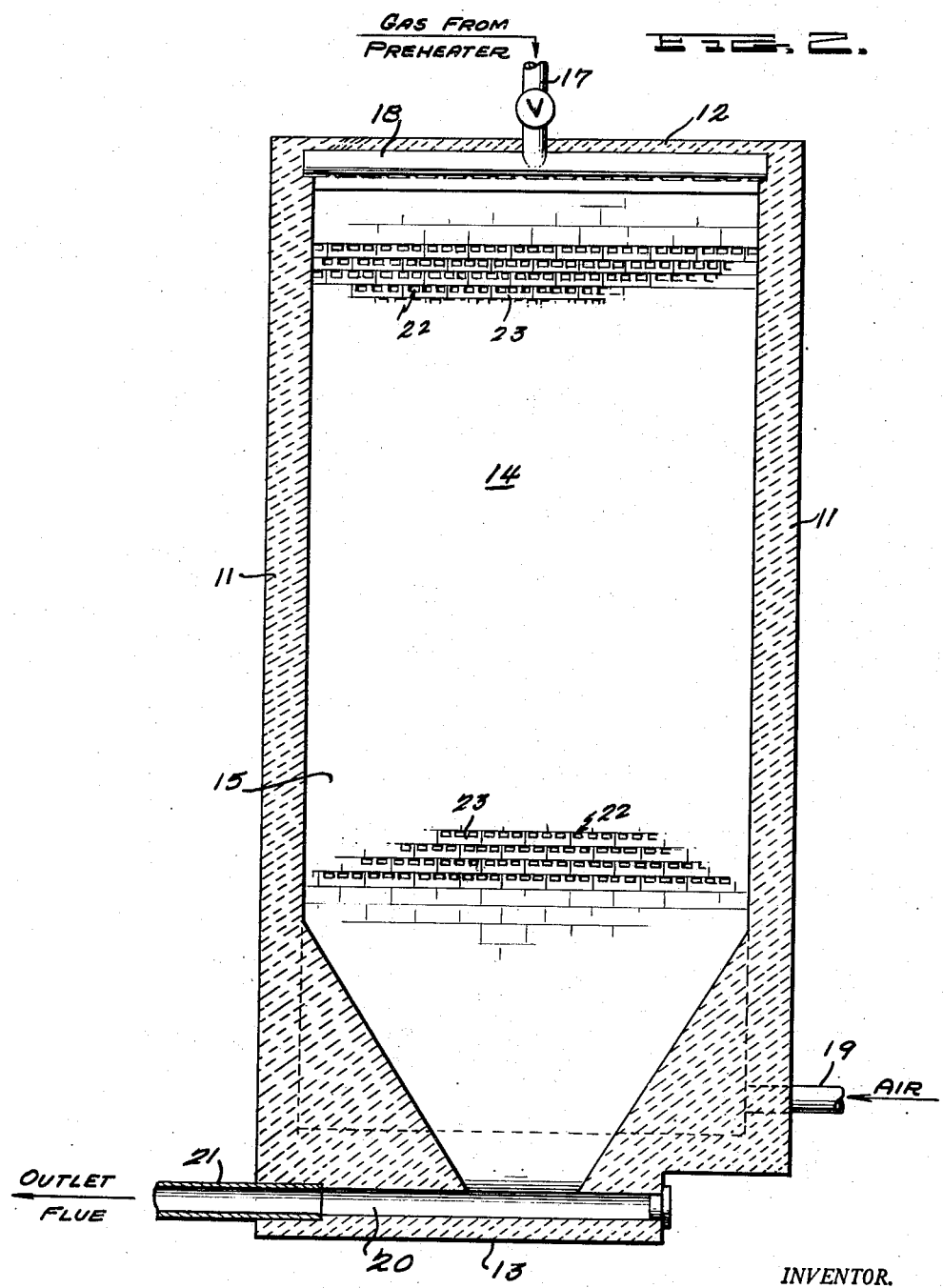

Aug. 18, 1953  E. B. MILLER  2,649,360
CARBON BLACK FURNACES
Filed Jan. 24, 1949  3 Sheets-Sheet 3
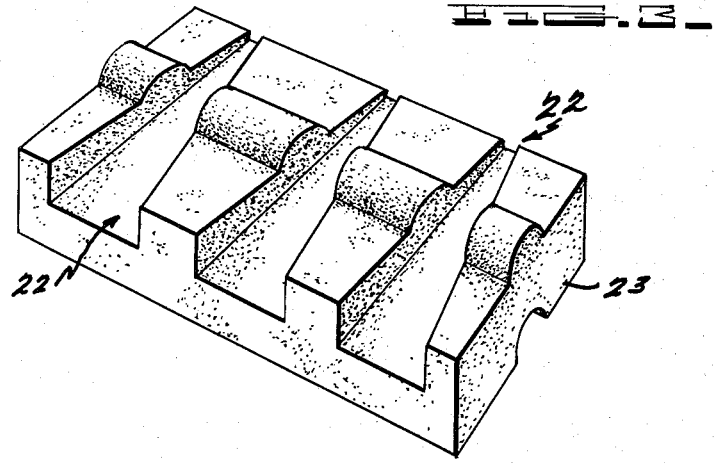
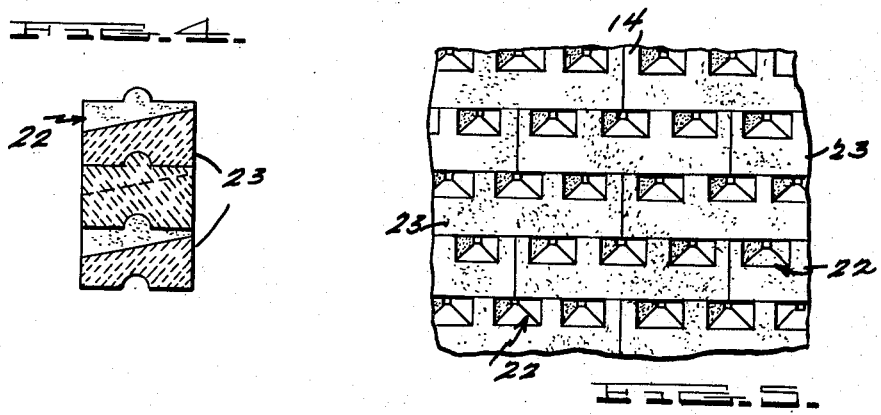
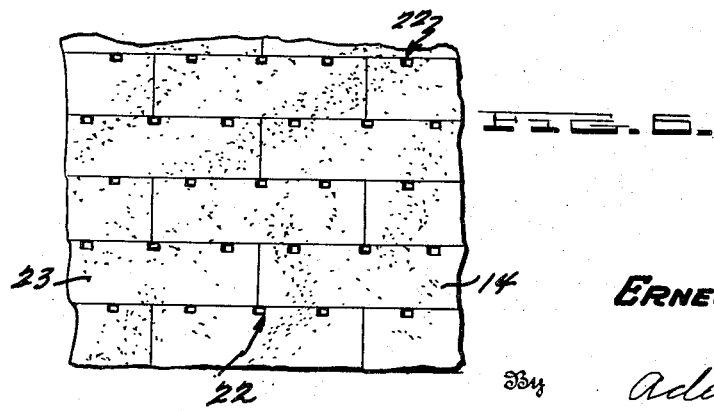
Inventor
ERNEST B. MILLER
By Adams + Bush
ATTORNEYS Patented Aug. 18, 1953

2,649,360

UNITED STATES PATENT OFFICE 2,649,360

CARBON BLACK FURNACES

Ernest B. Miller, Houston, Tex., assignor to Jefferson Lake Sulphur Company, New Orleans, La., a corporation of New Jersey Application January 24, 1949, Serial No. 72,425

3 Claims. (Cl. 23—259.5)

This invention relates to a furnace for making carbon black by the partial combustion of hydrocarbon gases.

One of the objects is to provide a furnace having a central reaction chamber into which air is admitted on opposite sides through a series of slots or openings to cause some of the gas to burn and form flames directed downwardly along the side walls of the chamber throughout its working area.

Another object of the invention is to provide a furnace of the down-draft type having air slots or openings in the side walls of a central reaction chamber of such total cross sectional area relative to the cross sectional area of the chamber as to insure substantially uniform distribution of air throughout the working height of the chamber. The idea is to provide a furnace of this type having a maximum capacity for producing carbon black of small particle size.

Other aims and advantages of the invention will appear in the specification when considered in connection with the accompanying drawings, wherein:

Fig. 2 is a vertical sectional view, taken on the line 2—2 of Fig. 1;

Fig. 3 is a perspective view of one form of refraction tile or brick used in building the furnace;

Fig. 4 is a fragmentary sectional view of a furnace wall; and

Figs. 5 and 6 are fragmentary face views taken on opposite sides of a slotted furnace wall.

Figure 1:
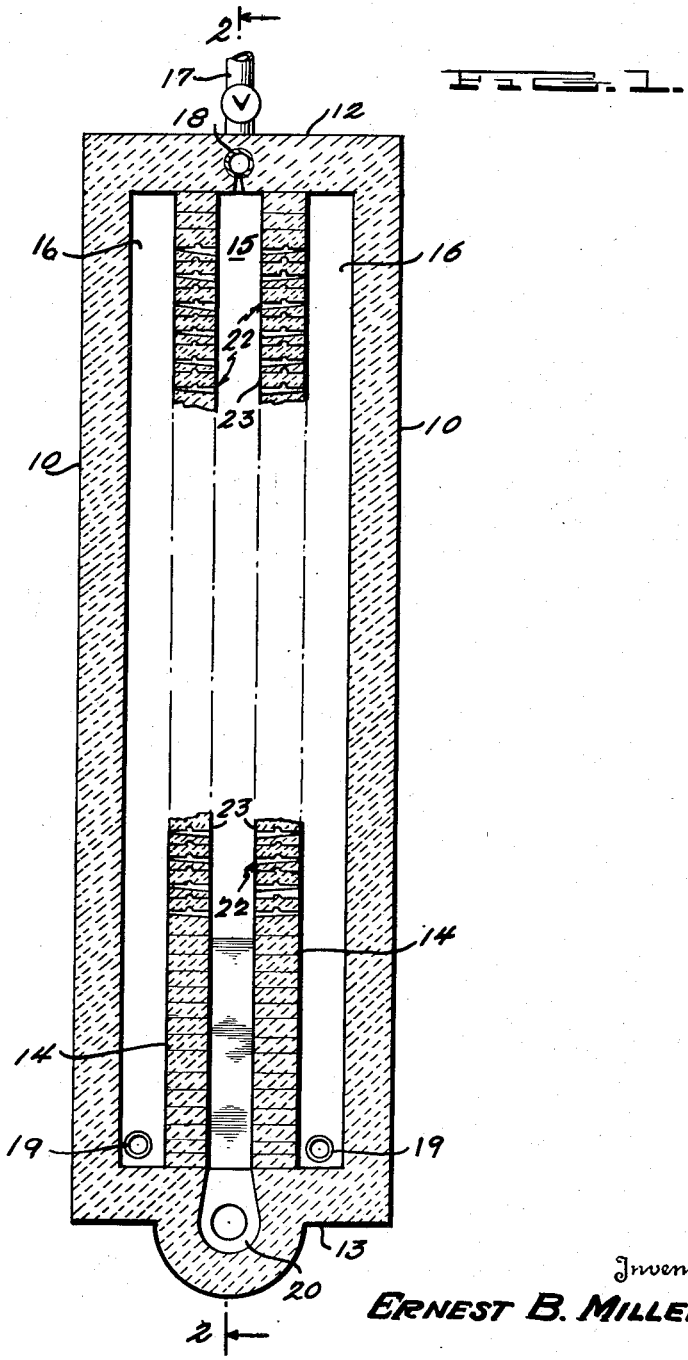
Fig. 1 is a vertical sectional view of a furnace embodying the invention.

Referring more particularly to the drawings, the furnace is illustrated as being of the downdraft type having a single reaction chamber. However, it will be understood that such furnaces have several such chambers in a single unit.

In this instance, the furnace is illustrated as being rectangular in cross section, having side walls 10, end walls 11, a top wall 12, and a bottom wall 13, all made of refractory material. A pair of perforated vertical partitions 14, made of refractory bricks, divides the furnace into a narrow central reaction chamber 15 and two air inlet chambers 16 on its opposite sides.

Preheated hydrocarbon gas, such as methane, is introduced in the upper end of the reaction chamber through a gas conduit 17 and perforated manifold 18, shown as being embedded in the upper wall 12. Preheated air to support partial combustion of the gas is introduced in the bottom portions of the air chambers through conduits 19. The reaction chamber has an outlet flue 20 connected to an outlet conduit 21 leading to a carbon collector.

In accordance with this invention, the partitions 14 forming the side walls of the reaction chamber are provided with a multiplicity of slots or perforations 22 dispersed throughout a major portion of their height and arranged in staggered vertical rows. The total, effective cross sectional area of these slots is so proportioned to the horizontal cross sectional area of the reaction chamber as to provide for substantially uniform flow of air into the reaction chamber throughout its height. Actual operation has demonstrated that the ratio should be between one to four and one to ten to produce best results. The slots are preferably wedge-shaped or flared horizontally from the air chambers into the the reaction chamber to provide for wide, slow-moving jets of air entering the reaction chamber, so that the air jets will not penetrate the gas stream to a substantial depth. The idea is to provide jet flames which wipe the entire surface of the inside walls of the reaction chamber throughout its working area or height. This prevents thermatomic carbon from being deposited on the walls and rapidly clogging up the reaction chamber.

Referring to Figs. 3 and 4, the slots 22 are shown as being formed across the upper faces of interlocking refractory bricks 23. Three flared slots are shown in each brick, one at the center and one on each side, so that they will be arranged in staggered vertical rows when the bricks are laid in the usual break-joint fashion to form the walls, as shown in Figs. 5 and 6. The slots in alternate horizontal rows of bricks are vertically aligned, so that the slots in adjacent vertical rows are staggered with respect to each other. Each slot has a very small inlet orifice and a wide outlet orifice. Obviously, the effective cross sectional area of the slots, which determines the rate of flow of air through them, is measured across the small inlet orifices. The horizontal space between the orifices is about half the width of the orifices. The air jets thus provide for wide, downwardly directed flames which wipe against and cover the inside walls of the reaction chamber.

The air flow in the air chambers is directed upwardly or opposite to the downward flow of the gas in the reaction chamber so that the air streams will acquire their maximum static pressure at the upper ends of the chambers and thus cause the air jets to flow into the reaction chamber against the pressure of the gas stream. The pressure of the air is maintained only slightly greater than that of the gas. If wide slots are provided and the air is introduced at the top of the air chambers, gas will escape through the slots and cause combustion to take place in the upper portions of the air chambers and thereby greatly reduce the production capacity of the furnace.

The construction and arrangement are such that the air introduced into the bottom portions of the air chambers at a pressure exceeding the pressure of the gas supplied to the reaction chamber is caused to flow through the slots substantially at a uniform rate throughout the working area of the reaction chamber. The uniform distribution of the small slots and their areas are important factors in maintaing a substantially uniform, effective pressure difference between the air and the gas streams.

In a furnace of this type, the width of the reaction chamber or thickness of the gas stream should not be more than five or six inches when the height is three to twelve feet and the gas capacity is twenty-five to thirty cubic feet of gas or oil vapor per minute. The gas is preheated to a temperature of about 800° F. to 1000° F. and about 250 cubic feet of air per minute is introduced at a temperature between 1000° F. and 1200° F. The temperature at the outlet of the reaction chamber is maintained at about 2300° F. The temperature is kept substantially uniform above the dissociation temperature of the gas throughout the working height of the reaction chamber.

Obviously, the invention is not restricted to the particular embodiment thereof herein shown and described.

What is claimed is:

1. In a carbon black furnace of the down-draft type having generally rectangular vertical side and end walls; a pair of spaced refractory walls within the furnace parallel with the side walls extending from top to bottom and defining a narrow reaction chamber not more than about six inches wide and an air chamber on each side between them and said side walls; a gas manifold in the upper end of said reaction chamber; air inlet conduits in the lower ends of said air chambers; said refractory walls of the reaction chamber having a multiplicity of small transverse slots extending therethrough and uniformly distributed throughout the working area of the reaction chamber to permit the introduction of air from the air chambers to the reaction chamber on opposite sides of the stream of gas passing therethrough; said slots being arranged in substantially horizontal rows with the slots in each row staggered with respect to the slots in the adjacent rows and each slot having a very small air inlet orifice leading from the air chamber and being horizontally flared toward the reaction chamber to permit the air to flow in relatively wide streams into said reaction chamber and thereby cause flames to wipe the entire inside surface of each refractory wall throughout the working height of the reaction chamber; and the total cross sectional area of the small ends of said slots in both walls being between about one-fourth and one-tenth of the horizontal cross sectional area of the reaction chamber.

2. In a carbon black furnace, as set forth in claim 1, wherein the refractory walls of the reaction chamber are made of bricks having the flared slots formed in their upper faces.

3. In a carbon black furnace, as set forth in claim 1, wherein the wide orifices of the slots entering the reaction chamber are substantially rectangular with the bottom walls thereof inclined downwardly to direct the air streams downwardly at an angle to the vertical stream of gas.

ERNEST B. MILLER.

References Cited in the file of this patent

UNITED STATES PATENTS

| Number | Name | Date |
|---|---|---|
| 1,592,474 | Szarvasy | July 13, 1926 |
| 2,062,358 | Frölich | Dec. 1, 1936 |
| 2,247,336 | O'Keeffe | June 24, 1941 |
| 2,436,282 | Bennett | Feb. 17, 1948 |
| 2,440,423 | Wiegand et al. | Apr. 27, 1948 |

FOREIGN PATENTS

| Number | Country | Date |
|---|---|---|
| 196,972 | Great Britain | May 4, 1923 |